United States Patent [19]
Tylinski

[11] 3,870,630
[45] Mar. 11, 1975

[54] SCREEN TENSIONING DEVICE
[75] Inventor: Raymond S. Tylinski, Milwaukee, Wis.
[73] Assignee: Rock Industries Machinery Corporation, Milwaukee, Wis.
[22] Filed: Aug. 15, 1973
[21] Appl. No.: 388,365

[52] U.S. Cl. .................................. 209/403, 85/7 R
[51] Int. Cl. .............................................. B07b 1/48
[58] Field of Search ......................................... 85/7; 209/403-405, 408, 409; 209/319

[56] References Cited
UNITED STATES PATENTS

| 228,697 | 6/1880 | Thompson | 85/7 |
| 597,143 | 1/1898 | Everett | 209/403 X |
| 1,371,396 | 3/1921 | Reveny | 85/7 X |
| 1,737,091 | 11/1929 | Northey | 85/7 |
| 3,186,547 | 6/1965 | Behnke | 209/403 |
| 3,203,548 | 8/1965 | Roubal | 209/403 X |

Primary Examiner—Robert Halper
Attorney, Agent, or Firm—Ronald E. Barry

[57] ABSTRACT

A vibrating screen tensioning device which is adapted to secure the edges of a screen to the side walls of a material vibrator the tensioning device including a plurality of bolts or shafts positioned in apertures in side rails provided on opposite sides of the vibrator in openings in the side walls of the vibrator, the shafts extending outwardly from the side walls and having slots spaced outwardly from the side walls and a C-shaped wedge positioned in the slot in each of said shafts each wedge including a tapered center section, a tapered arcuate section at one end of the center section and a flat section at the other end of the center section, the arcuate section and flat section cooperating to prevent the C-shaped wedge from vibrating off of the shaft.

4 Claims, 4 Drawing Figures

PATENTED MAR 11 1975  3,870,630

SCREEN TENSIONING DEVICE

BACKGROUND OF THE INVENTION

In vibratory type machinery which is used for screening granular materials, a screen is supported under tension between opposite sidewalls of the vibrator frame. Various tensioning assemblies have been designed to produce this result. The most common type of tensioning assembly is shown in the Brugmann Pat. No. 2,813,629, entitled "Screen Support," wherein a wedge shaped member is used to apply an outward force to a shaft to apply tension to the screen. Since the screens are used to handle tons of materials in short periods of time, they are subject to extensive wear and have to be replaced periodically. In the Brugmann type tension assembly, each of the wedge-shaped members has to be loosened from the shafts in order to release the screen. The wedge members, once loosened, often fall from the shaft and become lost.

SUMMARY OF THE INVENTION

The screen tensioning device of the present invention eliminates the above objection of the Brugmann type tensioning assemblies. In this regard, the screen tensioning device includes a C-shaped wedge having a tapered arcuate section at one end and an acute angled flat section at the other end. The wedge is mounted on a shaft or bolt positioned in apertures in the side rails and sidewalls of the vibrator and extends outwardly through an aperture in the framework. The screen is tightened by inserting the arcuate section into the slot and rotating the wedge through the slot to cam the shaft outwardly from the sidewall. Tension is relieved in the screen by merely rotating the wedge in the opposite direction in the slot. However, the wedge cannot vibrate off of the shaft due to the location and spacing between the arcuate section and the end of the flat section.

DRAWINGS

DESCRIPTION OF THE INVENTION

Figure 1:
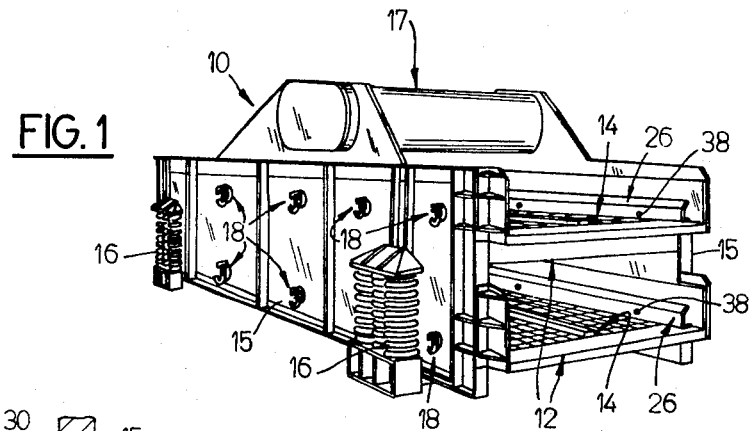
FIG. 1 is a perspective view of a vibrator of the type contemplated herein, showing the screen tensioning devices mounted on the sidewalls of the frame.

A material vibrator 10 of the type contemplated herein generally includes a frame 12 having sidewalls 15 for supporting a pair of vibrating screens 14. The frame is supported for vibratory motion on springs 16 and is vibrated by a motor driven eccentric assembly 17. The screens 14 are secured to the sidewalls by means of a plurality of screen tensioning devices 18 which are positioned in apertures in the sidewalls 15.

Figure 2:
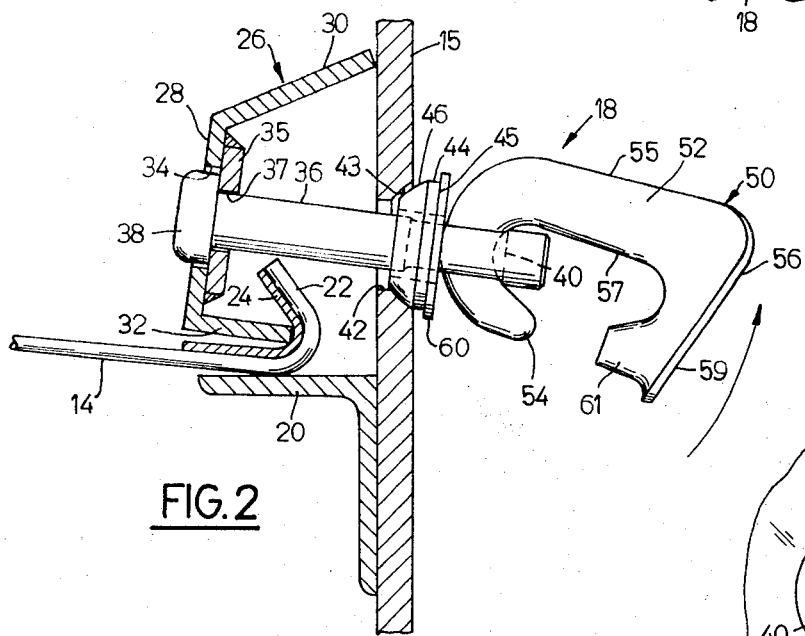
FIG. 2 is a side view in section showing the screen tensioning device of this invention in the screen release position.
Figure 4:
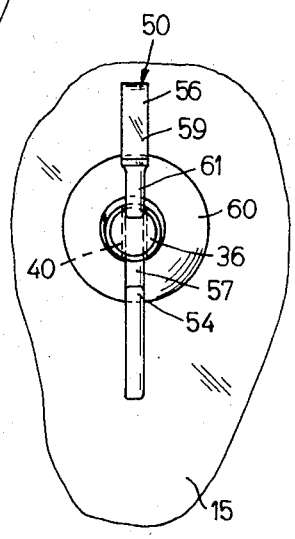
FIG. 4 is a view taken on line 4-4 of FIG. 3, showing the wedge in the screen tensioning position.
Figure 3:
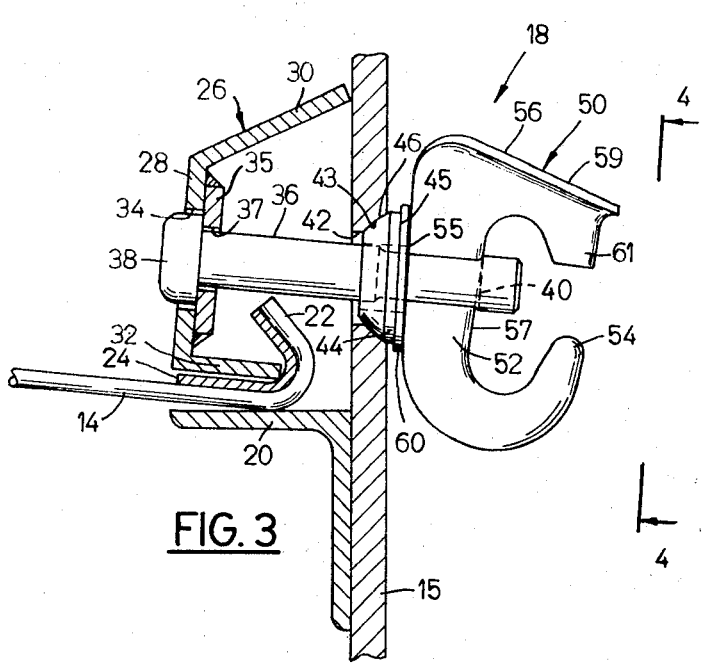
FIG. 3 is a view similar to FIG. 2, showing the screen tensioning device in the screen tensioning position.

The screens 14 as seen in FIGS. 2 and 3 are supported on brackets 20 which are secured to the sidewalls 15. Each screen 14 has an upturned edge 22 which is wrapped around and secured to an acute angle channel member 24.

Means are provided for securing the upturned edges 22 of the screens 14 to the inside surfaces of the sidewalls 15. Such means is in the form of side rails 26 which are located in a parallel spaced relation along the inside surfaces of the sidewalls 15. Each side rail 26 includes a center web 28, an upper or pivot flange 30 and a lower or screen-holding flange 32. A plurality of apertures 34 are located in the center web 28 at spaced intervals along the side rails. The aperture 34 can be recessed by welding support washers 35 having a small opening 37 to the inside surface of the center web 28.

Tension is applied to the screen 14 by means of the tensioning device 18 which includes a bolt or shaft 36 having an enlarged head 38 at one end and a slot 40 at the other end. The bolt or shaft 36 is positioned in the aperture 34 in the side rail and extends through the opening 37 outwardly through an aperture 42 in the sidewall 15. The aperture 42 tapers outwardly at 43 to provide a recess for centering washers 44.

The shaft 36 is centered in the aperture 42 by means of the centering washer 44. The centering washer 44 includes a conical peripheral surface 46 which matingly engages the surface 43 in the opening 42. The flat face 45 of the centering washer acts as a bearing surface as described hereinafter.

The shafts 36 are pulled outward from the sidewalls to apply tension to the screen 14 by means of a C-shaped wedge 50. The wedge 50 includes a tapered center section which terminates at one end in a tapered arcuate section 54 and at the other end in an acute angled flat section 56. Each wedge 50 includes a substantially flat edge 55 on one side of the center section 52 and a tapered camming edge 57 on the other side. The wedge 50 is mounted on the shaft or bolt 36 by positioning the end of the tapered arcuate section 54 into the slot 40 as shown in FIG. 2. The wedge is rotated into the slot until the flat edge 55 starts to bear on the flat surface 45 of the centering washer 44.

To apply tension to the screen, the wedge 50 is rotated until the flat edge 55 is flush with the flat surface 45 with the camming surface 57 forcing against the outside end of slot 40. The flat section 56 can then be struck with a hammer to drive the tapered camming surface 57 against the end of slot 40. The movement of the center section through the slot 40 will force the pin 36 to move outwardly from the sidewall. The side rail 26 will pivot about the point of engagement between the upper flange 30 and the sidewall 15 and the lower flange 32 which engages the channel member 24 in the upturned end 22 of the screen 14 will be forced against the channel member 24 to draw the edge of the screen outward.

The flat section 56 includes a flat plate or anvil 59 which can be used for hammering the tapered section 52 into slot 40. Means are provided at the end of the section 56 for preventing accidental removal of the wedge 50 from the shaft 36. Such means is in the form of a flange 61 which is spaced from the end of section 54 a distance slightly greater than the diameter of shaft 36. In the event the wedge 50 should become loose in slot 40, the wedge cannot come off of the shaft 36 because it will only move vertically due to vibration and can only be removed by manually moving the wedge laterally from the shaft 36.

Means can be provided for adjusting the amount of tension applied to the screens 14 in the form of a washer 60 provided on the shaft 36 between the centering washer 44 and the flat edge 55. One or more washers can be provided on the shaft 36 to provide proper tension on the screen 14.

The wedge 50, even if firmly wedged into the slot 40 in the bolt 36, may become loose because of vibration of the screen. However, even if loosened, the wedge 50 will not fall off of the bolt because of the C shape of the wedge. The ends of the section 54 will remain in the slot with the end of the section 56 bearing on the sidewall preventing further rotation of the wedge in the slot 40.

I claim:

1. A vibrating screen tensioning device for securing the upturned edges of a screen to the opposite sidewalls of a material vibrator, the said walls each including a number of openings, said device comprising:
   side rails positioned in a parallel spaced relation along the inside surface of the sidewalls, each side rail including,
   a central web,
   a pivot flange along the upper edge of the central web,
   and a screen locking flange along the lower edge of the central web,
   a plurality of openings spaced along the central web in positions corresponding to openings in the sidewalls,
   a tensioning shaft extending through each pair of corresponding openings in said web and in said sidewall,
   a slot in said tensioning shaft having one edge spaced outwardly from said sidewall,
   a C-shaped wedge for each shaft, each wedge including a tapered center section, a tapered arcuate section at one end of said center section, and an acute angled flat section at the other end of said center section, a centering washer on each of said shafts between said sidewall and said center section of said wedge when said screen is in tension, one of said wedges being positioned in each of said slots with one edge of said center section bearing on the said washer and the other edge bearing on one end of said slot.

2. The device according to claim 1 wherein said center section includes a flat edge on one side and a camming edge on the opposite side.

3. The device according to claim 2 to wherein said means at the other end of said center section is spaced a distance from the end of said arcuate section slightly greater than the diameter of said shaft for preventing removal of said wedge from said shaft.

4. A vibrating screen tensioning device for securing the edges of a screen to the opposite sidewalls of a material vibrator, said device comprising:
   side rails positioned in a parallel spaced relation along the inside surfaces of the sidewalls of the vibrator,
   each of said side rails including first means for pivotally engaging the sidewall and second means for engaging the edges of said screen,
   and means connected to said side rails and extending outwardly from said sidewalls for pivoting said side rails about said pivoting means for tensioning said screen,
   said pivoting means including a shaft having a slot spaced outwardly from said sidewall and a C-shaped wedge having a tapered center section adapted to be positioned in said slot, said center section including a flat edge on one side and a camming edge on the other side
   a centering washer on said shaft located between said sidewall and said C-shaped wedge, said centering washer including a flat surface in a position to matingly engage said flat edge when said screen is in tension,
   an arcuate tapered end section at one end of said center section and an acute angled section at the other end for preventing removal of said wedge from said shaft, whereby said shaft can be moved between release and tensioning positions with respect to said screen.

* * * * *

PO-1050
(5/69)

UNITED STATES PATENT OFFICE
CERTIFICATE OF CORRECTION

Patent No. 3,870,630    Dated March 11, 1975

Inventor(s) RAYMOND S. TYLINSKI

It is certified that error appears in the above-identified patent and that said Letters Patent are hereby corrected as shown below:

Col. 3, line 14, cancel "said walls" and substitute ---sidewalls---;

Col. 4, line 5, cancel "to" (second occurrence).

Signed and sealed this 20th day of May 1975.

(SEAL)
Attest:

RUTH C. MASON
Attesting Officer

C. MARSHALL DANN
Commissioner of Patents
and Trademarks